(12) United States Patent
Faasse et al.

(10) Patent No.: US 8,479,034 B2
(45) Date of Patent: Jul. 2, 2013

(54) CONTROLLING THE POWER USAGE OF A COMPUTER

(75) Inventors: Scott P. Faasse, Tomball, TX (US); Alan L. Goodrum, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 12/853,148

(22) Filed: Aug. 9, 2010

(65) Prior Publication Data

US 2012/0036385 A1 Feb. 9, 2012

(51) Int. Cl.
*G06F 1/00* (2006.01)
*G06F 1/30* (2006.01)

(52) U.S. Cl.
CPC .................................... *G06F 1/30* (2013.01)
USPC .......................................... 713/340; 713/330

(58) Field of Classification Search
USPC ................. 713/300–340, 500–501, 600–601
See application file for complete search history.

(56) References Cited

U.S. PATENT DOCUMENTS

| 7,536,567 | B2* | 5/2009 | Bonola et al. | 713/300 |
|---|---|---|---|---|
| 7,596,705 | B2* | 9/2009 | Kim | 713/300 |
| 7,681,054 | B2* | 3/2010 | Ghiasi et al. | 713/320 |
| 7,689,851 | B2 | 3/2010 | Sawyers et al. | |
| 7,900,071 | B2* | 3/2011 | Bell, Jr. et al. | 713/322 |
| 2006/0136761 | A1* | 6/2006 | Frasier et al. | 713/320 |
| 2008/0082844 | A1* | 4/2008 | Ghiasi et al. | 713/323 |
| 2009/0150693 | A1 | 6/2009 | Kashyap et al. | |
| 2010/0218029 | A1* | 8/2010 | Floyd et al. | 713/601 |
| 2011/0093724 | A1* | 4/2011 | Park et al. | 713/300 |

* cited by examiner

*Primary Examiner* — Raymond Phan
(74) *Attorney, Agent, or Firm* — Steven L. Webb

(57) ABSTRACT

A method and apparatus for controlling the power usage of a processor is disclosed. The power usage of the processor is monitored. When the power usage of the processor exceeds a threshold power usage value, the power used by the processor is reduced or limited. A processor utilization value is also monitored. When the processor utilization value is above a threshold utilization value, the processor is ramped to a higher performance state. When power to the processor is being limited, a first rate is used to ramp the processor to the higher performance state. When power to the processor is not being limited, then a second rate, different from the first rate, is used to ramp the processor to the higher performance state.

14 Claims, 2 Drawing Sheets

CONTROLLING THE POWER USAGE OF A COMPUTER

BACKGROUND

Computer systems use a significant amount of power. Reducing the amount of power used and/or using the power more efficiently helps reduce the cost of operating the computer systems. Operating the computer system more efficiently give the user more results for a given amount of power used. Limiting the peak amount of power used by a computer system is sometimes called power capping. Power capping can reduce the cost of the power and cooling infrastructure by limiting the maximum load that it must support.

Power capping can be done by monitoring the power draw of a computer system. When the power draw exceeds a threshold value, the amount of power used by the system is reduced until the power draw is below the threshold. Typically, one of the main consumers of power in a computer system is the processor. By reducing the clock speed of a processor, the total power used by the computer system may be reduced. in some computer systems, for example blade systems, power capping can he done at a system level, a rack level, a blade level, or at the individual processor level.

In data centers, all the computer systems may not be utilized equally. Some systems may be fully utilized while other systems may be lightly utilized or may be idle. Running a processor at maximum clock speed when the processor is not doing any work is inefficient. Performance management systems monitor the utilization or usage of the computer systems and reduce power to systems that are lightly utilized or are at idle. Performance management systems may reduce power by reducing the clock speed and/or the voltage to processors that are lightly utilized or that are at idle. One example performance management system is disclosed in U.S. Pat. No. 7,536,567 "Bios-based system and method of processor power management" granted May 19, 2009 and which is hereby incorporated by reference for all that it teaches, Currently the power capping and performance management systems may operate independently, This allows the two systems to be optimized for their particular needs, for example the power capping system typically needs to react much more quickly than the performance management system. Both the power capping and performance management systems use the clock speed of the processor to control the computer systems power usage. When the two systems are operating independently, the two systems may interact and enter an astable state where the power capping system will reduce power to a system by throttling the performance, and the change in performance will cause the performance management system to change states and thus impact the power draw of the system. Oscillation may occur if state changes for both systems are not synchronized and the two cannot agree upon a steady state. In some instances the interaction of the two systems may cause power spikes that exceed the power capping threshold.

DETAILED DESCRIPTION

Figure 1A:
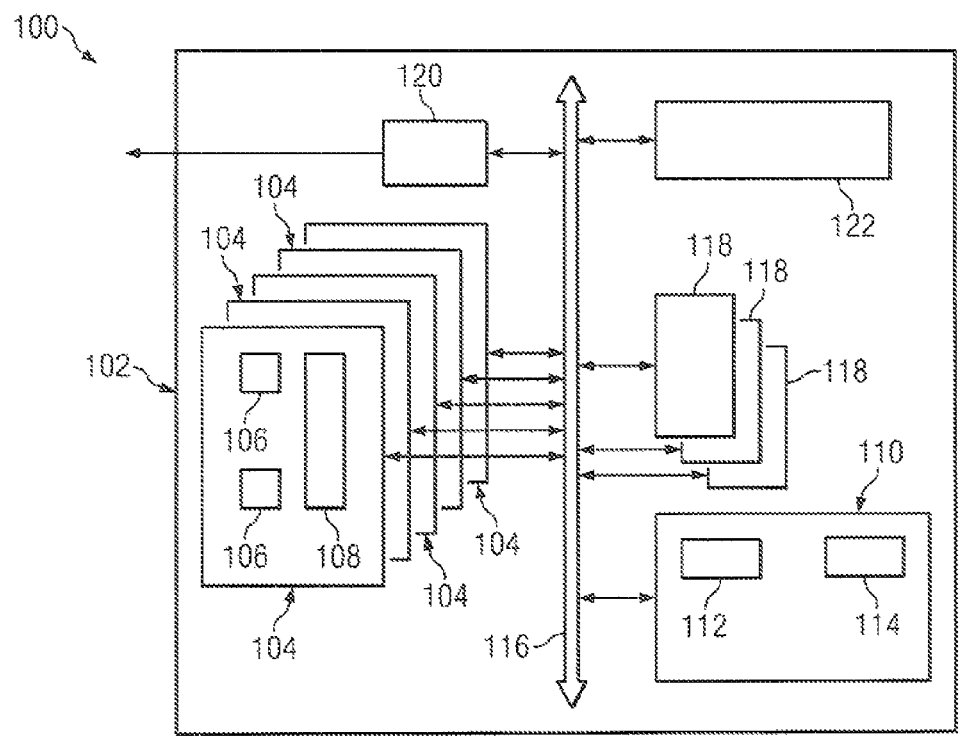
FIG. 1A is a diagram of a computer system 100 in an example embodiment of the invention.
Figure 1B:
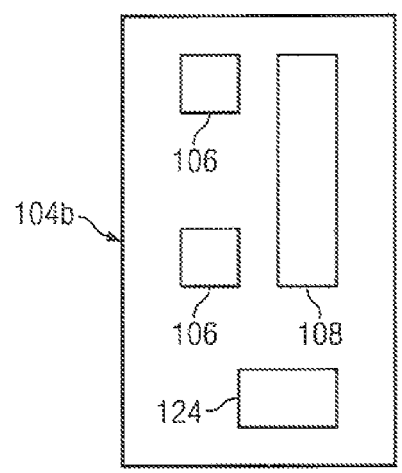
FIG. 1B is a block diagram of a processor blade 104b in another example embodiment of the invention.
Figure 2:
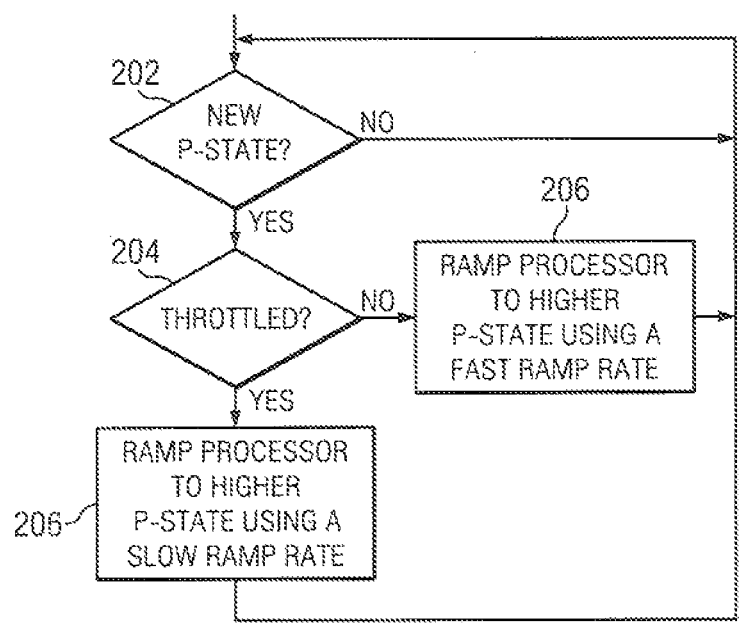
FIG. 2 is a flow chart showing a method for controlling the power usage of a computer system in an example embodiment of the invention.

FIGS. 1-2, and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents. In this application a computer system, one or more computer processors, or hardware, for example an application specific integrated circuit (ASIC), running computer executable code to accomplish a task, may be described as a system, a module or a process. The computer executable code may be firmware, software, or one or more segments of the basic input output system (BIOS).

in one example embodiment of the invention, information is passed between a power capping system and a performance management system such that the performance management system modifies its control algorithm dependent on if the power capping system is currently throttling or limiting performance of the system. The power capping system monitors the power draw of the system. When the power draw of the system exceeds a threshold value, the power capping system reduces or limits the power usage of the system. The performance management system monitors the utilization of the system. When the utilization of the system exceeds a threshold value, the performance management system ramps the system to a higher performance state. When power to the system is currently being limited by the power capping system, the performance management system will ramp the system to a higher performance state using a first ramp rate. When power to the system is not currently being limited by the power capping system, the performance management system will ramp the system to a higher performance state using a second, faster, ramp rate.

FIG. 1A is a diagram of a computer system 100 in an example embodiment of the invention. Computer system 100 comprises rack 102, processor blades 104, controller 110, bus 116, I/O board 120, auxiliary blades 118, and power system 122. Processor blades 104, controller 110, I/O board 120, auxiliary blades 118, and power system 122 are mounted inside rack 102 and couple to bus 116. Bus 116 may be any type of communications bus or fabric, for example a PCIe bus. Processor blades 104 may comprise one or more processors 106 and memory 108. Processors 106 are capable of operating at multiple power levels. Auxiliary blades 118 may comprise memory blades, storage blades, additional I/O blades or the like. Controller 110 may comprise one or more processor 112 and memory 114. Power system may comprise one or more power supplies and one or more power controllers. Power system is also coupled to the different components with a power bus (not shown for clarity) that provides power from the power system to the other components. In one example embodiment of the invention, multiple computer systems 100 will be coupled together and operated as a group, for example in a data center.

In operation, the processors 106 on the processor blades 104 may be executing code. The code may be one or more operating systems, application programs, firmware routines, or the like. Controller 110 may be running code that monitors the operation of computer system 100, in one example embodiment of the invention, controller 110 will be concurrently running a power capping module and a performance management module. In another example embodiment of the invention, the performance management module may be running as part of the firmware operated by each processor 106. In this example, each processor 106 may be running its own copy or instantiation of the performance management module. When multiple copies of the same software are running on one or more processors, each different copy running is typically called an instantiation of the code.

In another example embodiment of the invention, some functions of controller 110 may be integrated onto each processor blade 104. FIG. 1B is a block diagram of a processor blade 104b in another example embodiment of the invention. Processor blade 104b is the same as processor blades 104 shown in FIG. 1A except for the addition of micro-controller 124. Micro-controller 124 runs code that monitors the operation of processor blade 104b as well as processors 106. The code run by micro-controller 124 may be firmware, software, code in a basic input/output system (BIOS), or the like. In this example embodiment of the invention, controller 110 will be running power capping module and the micro-controller 124 on each processor blade will be running its own copy of the performance management module.

Power capping module will communicate with power system 122 to monitor the power draw of computer system 100. In one example embodiment of the invention, power capping module may monitor the power draw of the computer system at the rack, the blade and/or the processor level, in other embodiments of the invention, power capping module may monitor the power draw of the computer system only at the rack or blade level. Power capping module may monitor the power draw of computer system on a periodic bases or may monitor the power draw of the system using an event driven system. When power capping module monitors the power periodically, power capping module may poll power system 122 at a timed interval to retrieve the power draw information. When power capping module monitors the power using an event driven method, a hardware interrupt may trigger when the power draw of the system, or of a component, exceeds a threshold amount.

When power capping module determines that the power draw of the system, rack, blade, or processor has exceeded a threshold value, power capping module will reduce the power draw of the system, rack, blade, or processor. in one example embodiment of the invention, power capping module reduces the power draw of the system by reducing the clock frequency for one or more processors in the computer system. Reducing the clock frequency of a processor may also be known as throttling the processor. A percentage may he used as the throttling amount, for example a 10% throttling amount will mean a 10 percent reduction in the clock frequency.

Each instantiation of the performance management module, running on controller 110, processor 106, or micro-controllers 124, will monitor the power usage of the processor(s) 106 on the processor blades. The performance management module may monitor the power usage of the processors periodically. The performance management module may monitor one or more of the processors 106 on a blade as a group, the processors on multiple processor blades 104 as a group, or may monitor each processor 106 on each of the processor blades 104 individually. Performance management module will increase the performance state of a processor (or processor group) that is being utilized by more than a first amount, and reduce the performance state of a processor when the processor is being utilized by less than a second amount.

When a performance management module determines that a processor is operating at a processor utilization higher than the first amount, the performance management module will determine if the power capping module is currently limiting the amount of power used by the computer system. If the power capping module is not currently limiting the amount of power used by the computer system, the performance management module will ramp the processor to the maximum performance state using a first rate. If the power capping module is currently limiting the amount of power used by the computer system, the performance management module will ramp the processor using a second slower rate. in one example embodiment of the invention, the first rate is a single step all the way to the maximum performance state and the second rate is one performance state at a time.

FIG. 2 is a flow chart showing a method for controlling the power usage of a computer system in an example embodiment of the invention. At step 202 a performance management module determines if a processor needs to be switched to a new performance state or p-state. If the processor does not need to be switched to a new p-state, how returns to step 202. If a new p-state is needed, the performance management module determines if the processor is being throttled at step 204. If the processor is not being throttled, the processor is ramped to a higher p-state using a fast ramp rate at step 206. If the processor is being throttled, the processor is ramped to a higher p-state using a slow ramp rate at step 208. Flow then returns to step 202.

In one example embodiment of the invention, a performance state or p-state of a processor is defined by a discrete combination of the clock frequency and voltage level being supplied to the processor. Although the processor 106 may be operated throughout a range of voltages and clock frequencies (e.g 0.956-1.484 volts and 0.6-1.6 GHz for an Intel Pentium M processor), the processor 106 may be limited to operating only at certain discrete combinations of voltages and frequencies. The use of only selected pairs of values keeps the processor operating properly and avoids exceeding the electrical and thermal limits of the processor 106. Thus, for example, at 1.6 GHz the core of an Intel Pentium M class processor can be operated at 1.484 volts, and at 600 MHz the core can be operated at 0.956 volts. But at 1.6 GHz the core may fail to operate properly if it is operated at 0.956 volts, and at 600 MHz the core may exceed either its electrical or thermal tolerances, or both, if it is operated at 1.484 volts. In addition, limiting the supported frequency and voltage combinations for the processor greatly reduces validation time. Limiting the performance states to a number of discrete combinations of voltages and frequencies causes the granularity of control for the performance management system to be larger than the granularity of control for the power capping module. In one example embodiment of the invention, there may be between 8 and 16 performance states, for example 12 discrete combinations of voltages and frequencies. The power capping module is independent from the power manager module and is not limited to the clock frequencies that correspond to the frequencies in the selected pairs of values for the performance states.

The power draw of computer system 100 may be limited by the power infrastructure that supplies power to the computer system. For example, the circuits coupled to the computer system may be limited to 10 kilowatts. in this example, the power capping system is used to limit the power draw of computer system to 10 kW or less. Because the power draw of the computer system may be a hard limit imposed by the infrastructure supporting the computer system, power capping system should be configured to be able to respond promptly to keep the power draw of the computer system at or below the power draw limit.

In one example embodiment of the invention, the power capping module may operate with a faster response time than the performance management modules. If both the power capping module and the performance management modules use an interrupt, the power capping module would have a higher priority interrupt. if both the power capping module and the performance management modules use a push or pull polling method, then the power capping module would have a shorter interval between polls.

In one example embodiment of the invention, information is passed between the power capping module and each of the performance management modules using a push or pull data transfer method. For example, each of the performance management modules may read data from a mailbox that is updated periodically by the power capping module. In another example embodiment of the invention, the performance management modules may retrieve the data from the controller running the power capping module. For example, the performance management modules may read the hardware register(s) that contains the current throttling amount.

In one example embodiment of the invention, the information passed between the power capping module and the performance management modules may be binary in nature, for example the power capping module is or is not currently throttling the computer system. In other example embodiments, the information may contain additional information, for example the amount or percentage that the computer system is being throttled. The information may apply to the computer system as a whole, a processor blade or group of processor blades, a processor or a group of processor (spanning one or more processor blades). The information may also apply to a specific instant in time, or may be an average over a period of time.

In some example embodiments of the invention, the ramp rates may vary by the number of different p-states that are changed in each step. For example, the fast ramp rate may set the end p-state to the maximum p-state in a single step. The slow ramp rate may change the p-state by one p-state at every step or at an interval containing multiple steps.

The performance management system also reduces the p-state of processors when the processors are underutilized, The performance management system may have more information about the current processor utilization when lowering the p-state of a processor compared to when the p-state needs to be increased. In one example embodiment of the invention, the utilization rate may be a percentage of user instructions retired by the processor. For example, the utilization rate may be the number of user instructions retired by the processor in a given time period divided by the total number of possible user instructions retired in the given time period for the current p-state of the processor. In another example embodiment of the invention, the utilization rate may be measured using the number of non-idle clock cycles divided by the total available clock cycles. When the processor is operating at or near the maximum utilization rate for a given p-state, the additional amount of performance needed by the processor cannot be determined using the utilization rate. It could be that the processor requires only a small increase in performance, or it could be that the processor requires its maximum performance.

In contrast, when the performance management system determines that a processor is underutilized, the amount of underutilization is given by the utilization measurement. For example when the utilization rate is 80% for a given performance state, the performance management system can safely lower the performance of the processor by 20% or less. The change in performance between the different p-states can be determined analytically or measured. Because there are a limited number of performance states, the performance management system may not be able to adjust the utilization rate to exactly match the required performance of the processor.

In one example embodiment of the invention, the performance management system may use the throttling information when lowering the p-state of a processor. When the power capping system is not throttling the processor, the performance management system may lower the p-state to the closest p-state that matches the current utilization rate in one step. When the power capping system is throttling the processor, the performance management system may lower the p-state at a faster rate. The faster rate is based, at least in part, on the throttling amount. The faster rate may be one additional p-state more than when there is no throttling.

What is claimed is:

1. A method for controlling power usage of a processor, comprising:
   monitoring the power usage of the processor;
   limiting the power used by the processor when the power usage of the processor exceeds a threshold power usage value;
   monitoring processor utilization and ramping the processor to a higher performance state when the processor utilization is above a threshold utilization;
   when power to the processor is being limited then using a first rate for ramping the processor to the higher performance state;
   when power to the processor is not being limited then using a second rate, different from the first rate, for ramping the processor to the higher performance state.

2. The method for controlling power usage of a processor of claim 1, wherein the second rate moves the processor to a highest performance state in one step.

3. The method for controlling power usage of a processor of claim further comprising:
   ramping the processor to a lower performance state when the processor utilization is below a second threshold utilization;
   when power to the processor is being limited then using a third rate for ramping the processor to the lower performance state;
   when power to the processor is not being limited then using a fourth rate, different from the third rate, for ramping the processor to the lower performance state.

4. The method for controlling power usage of a processor of claim 1, wherein power to the processor is limited by reducing the clock rate of the processor.

5. The method for controlling power usage of a processor of claim 1, wherein each processor performance state comprises a clock frequency for the processor and a voltage supplied to the processor.

6. A computer system, comprising:
   a processor operable at a plurality of power levels, the processor capable of storing a processor utilization value, the processor running a performance management module;
   a management controller coupled to the processor, the management controller running a power capping module
   the power capping module monitoring the power usage of the processor;
   the power capping module reducing power to the processor when the power usage of the processor exceeds a threshold power usage value;
   the performance management module monitoring the processor utilization value and ramping the processor to a higher performance state when the processor utilization value is above a threshold utilization value;

when power to the processor is being limited by the power capping module then the performance management module will use a first rate for ramping the processor to a higher performance state;

when power to the processor is not being limited by the power capping module then the performance management module will use a second rate, different from the first rate, for ramping the processor to a higher performance state.

7. The computer system of claim 6, further comprising;
a micro-controller coupled to the processor, the micro-controller running the performance management module instead of the processor.

8. The computer system of claim 6, wherein the second rate moves the processor to a highest performance state in one step.

9. The computer system of claim 6, wherein the power capping module has a faster response time than the performance management module.

10. The computer system of claim 6, wherein the performance management module monitors the processor utilization value and ramps the processor to a lower performance state when the processor utilization value is below a second threshold utilization value;

when power to the processor is being limited then the performance management module uses a third rate for ramping the processor to the lower performance state;

when power to the processor is not being limited then the performance management module uses a fourth rate, different from the third rate, for ramping the processor to the lower performance state.

11. The computer system of claim 6, wherein power to the processor is limited by reducing the clock rate of the processor.

12. The computer system of claim 6, wherein each processor performance state comprises a clock frequency for the processor and a voltage supplied to the processor.

13. A computer system, comprising:

a plurality of processors, each processor operable at a plurality of power levels, each processor capable of storing a processor utilization value;

at least one management controller coupled to the plurality of processors, the at least one management controller running a power capping module;

a plurality of micro-controllers, wherein each of the plurality of micro-controllers runs an instantiation of a performance management module;

the power capping module monitoring the power usage of the plurality of processors;

the power capping module reducing power to at least one of the plurality of processors when the power usage of the plurality of processor exceeds a threshold power usage value;

each of the plurality of performance management modules monitoring the processor utilization value for at least one of the plurality of processor and ramping the at least one of the plurality of processor to a higher performance state when the corresponding processor utilization value is above a threshold utilization value;

when power to one of the plurality of processors is being limited by the power capping module then each of the plurality of performance management modules will use a first rate for ramping each of the plurality of processors to a higher performance state;

when power to any of the plurality of processors is not being limited by the power capping module then each of the plurality of performance management modules will use a second rate, different from the first rate, for ramping each of the plurality of processors to a higher performance state.

14. The computer system of claim 13, wherein the power capping module independently monitors the power usage of each of the plurality of processors.

* * * * *

UNITED STATES PATENT AND TRADEMARK OFFICE
CERTIFICATE OF CORRECTION

PATENT NO. : 8,479,034 B2  
APPLICATION NO. : 12/853148  
DATED : July 2, 2013  
INVENTOR(S) : Scott P. Faasse et al.

Page 1 of 1

It is certified that error appears in the above-identified patent and that said Letters Patent is hereby corrected as shown below:

In the Claims

Column 6, line 36, in Claim 3, delete "claim" and insert -- claim 1, --, therefor.

Signed and Sealed this  
First Day of October, 2013

Teresa Stanek Rea  
*Deputy Director of the United States Patent and Trademark Office*